United States Patent
Wang (10) Patent No.: US 8,380,904 B2
(45) Date of Patent: Feb. 19, 2013

(54) INTERCONNECT COUPLED TO MASTER DEVICE VIA AT LEAST TWO DIFFERENT BIDIRECTIONAL CONNECTIONS

(75) Inventor: Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 12/720,164

(22) Filed: Mar. 9, 2010

(65) Prior Publication Data

US 2011/0225333 A1    Sep. 15, 2011

(51) Int. Cl.
G06F 13/00    (2006.01)
(52) U.S. Cl. ......... 710/110; 710/305; 710/306; 710/312
(58) Field of Classification Search .......... 710/300–317, 710/8–19, 31, 36–38, 104–110, 1–2; 326/98
See application file for complete search history.

(56) References Cited

U.S. PATENT DOCUMENTS

| | | | |
|---|---|---|---|
| 7,902,878 B2* | 3/2011 | Saint-Laurent et al. | 326/98 |
| 7,934,046 B2* | 4/2011 | Butter et al. | 710/317 |
| 7,969,767 B2* | 6/2011 | Li et al. | 365/158 |
| 8,006,021 B1* | 8/2011 | Li et al. | 710/306 |
| 8,059,638 B2* | 11/2011 | Nam et al. | 370/386 |
| 2004/0225793 A1* | 11/2004 | Hunter et al. | 710/300 |
| 2006/0031622 A1* | 2/2006 | Jardine | 710/310 |
| 2009/0157919 A1 | 6/2009 | Dodson et al. | |
| 2009/0164691 A1* | 6/2009 | Wang et al. | 710/309 |
| 2009/0216920 A1* | 8/2009 | Lauterbach et al. | 710/36 |
| 2009/0307408 A1* | 12/2009 | Naylor | 710/317 |
| 2010/0268892 A1* | 10/2010 | Luttrell | 711/137 |
| 2010/0329147 A1* | 12/2010 | Nam et al. | 370/254 |

OTHER PUBLICATIONS

Huang et al., Optimization Techniques of On-chip Memory System Based on UltraSPARC Architecture, 2009, IEEEXplore, pp. 428-431.*
International Search Report and Written Opinion—PCT/US2011/027695—ISA/EPO—Jun. 15, 2011.
Matthew J Koop et al: "Performance Analysis and Evaluation of PCIe 2.0 and Quad-Data Rate InfiniBand", High Performance Interconnects, 2008. HOTI '08. 16th IEEE Symposium on, IEEE, Piscataway, NJ, USA, Aug. 26, 2008, pp. 85-92, XP031316490, ISBN: 978-0-7695-3380-3.

* cited by examiner

*Primary Examiner* — Raymond Phan
(74) *Attorney, Agent, or Firm* — Sam Talpalatsky; Nicholas J. Pauley; Johnathan T. Velasco (57) ABSTRACT

An interconnect coupled to a master device via at least two different connections is disclosed. In a particular embodiment, a system is disclosed that includes a first interconnect and a second interconnect coupled to the first interconnect. The first interconnect is coupled to a first master device via a single connection and the first interconnect is coupled to a second master device via at least two different connections. The second interconnect is coupled to a memory via a memory controller.

32 Claims, 7 Drawing Sheets

INTERCONNECT COUPLED TO MASTER DEVICE VIA AT LEAST TWO DIFFERENT BIDIRECTIONAL CONNECTIONS

I. FIELD

The present disclosure is generally related to an interconnect coupled to a master device via at least two different connections.

II. DESCRIPTION OF RELATED ART

For a communication system that provides communication between one or more master devices and one or more memory devices using interconnects, the links between interconnects may be a potential bottleneck hindering throughput. One approach has been to increase the number of links between the interconnects to increase the bandwidth. For example, a dual link may be used between interconnects instead of a single link. However, increasing the number of links between interconnects increases interconnect routing complexity, increases the area taken up by the interconnects as well as the power consumed by the interconnects, and increases timing complexity.

III. SUMMARY

Master devices are classified into two categories, high-throughput master devices and standard master devices. High-throughput master devices demand high throughput and a single link coupling interconnects between a high-throughput master device and a memory device may present a bottleneck. Standard master devices request lower throughput and a single link coupling interconnects does not present a bottleneck. A single link is used to couple each of the interconnects. For example, a first interconnect may be coupled to a second interconnect via a single link. Each high-throughput master device is partitioned into multiple sub-master devices and each sub-master device has a connection to an interconnect. Partitioning the high-throughput master devices mitigates throughput limits due to the single link coupling the interconnects.

In a particular embodiment, a system is disclosed that includes a first interconnect and a second interconnect coupled to the first interconnect. The first interconnect is coupled to a first master device via a single connection and the first interconnect is coupled to a second master device via at least two different connections. The second interconnect is coupled to a memory via a memory controller.

In another particular embodiment, a method is disclosed that includes coupling a first interconnect to a first master device via a single connection. The method also includes coupling the first interconnect to a second master device via at least two different connections. The method further includes coupling a second interconnect to the first interconnect. The method further includes coupling the second interconnect to a memory via a memory controller.

One particular advantage provided by at least one of the disclosed embodiments is that using a single link to couple the interconnects while partitioning the high-throughput master devices into multiple sub-master devices increases the throughput for the high-throughput masters and compensates for potential performance loss due to the single link coupling the interconnects. Using a single link to couple the interconnects reduces the interconnect routing complexity, reduces the area taken up by the interconnects, reduces the power consumed by the interconnects, and reduces the timing complexity. In addition, a single link coupling the interconnects may run at a higher frequency than multiple links coupling the interconnects. Other aspects, advantages, and features of the present disclosure will become apparent after review of the entire application, including the following sections: Brief Description of the Drawings, Detailed Description, and the Claims.

V. DETAILED DESCRIPTION

Figure 1:
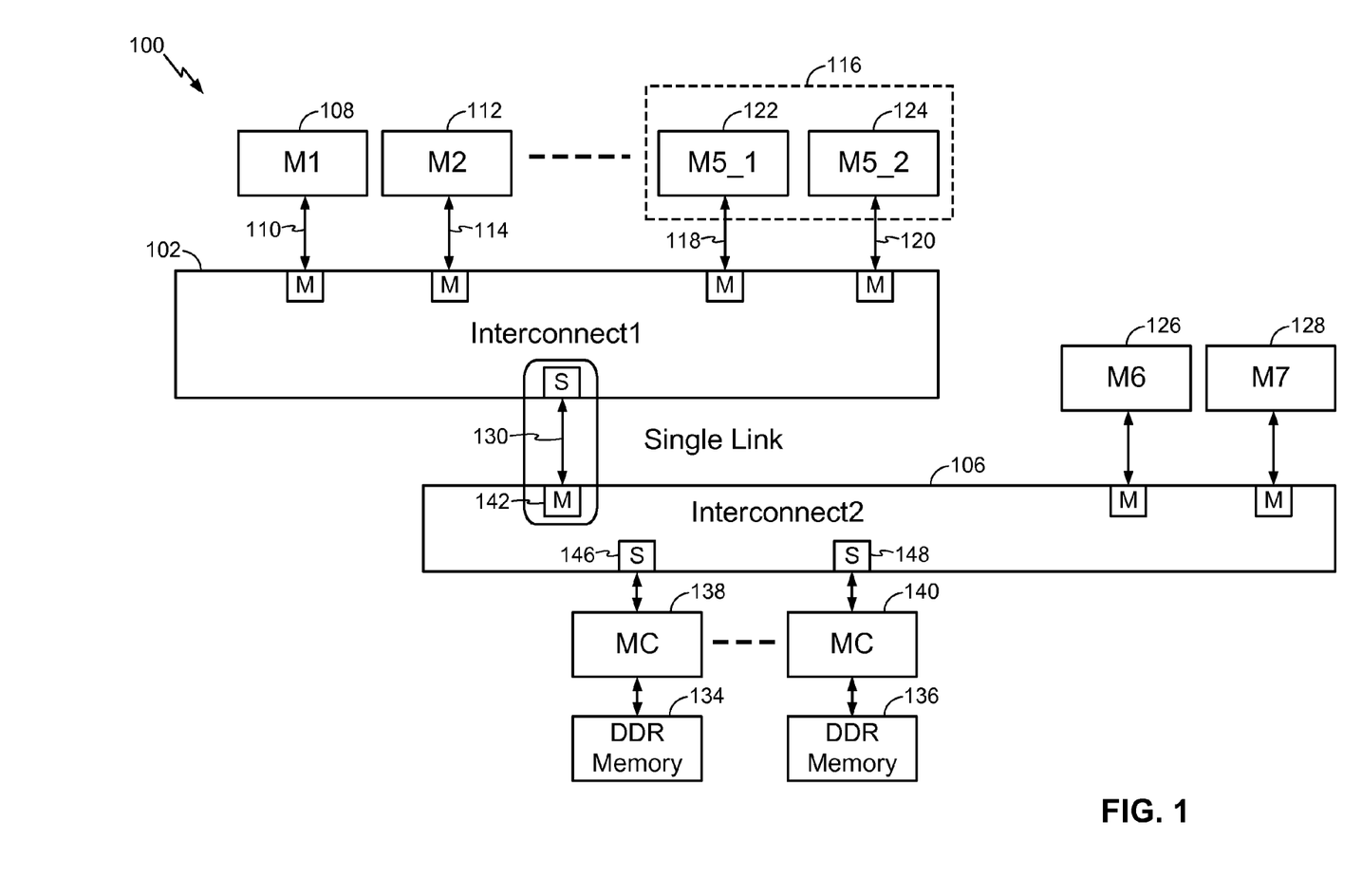
FIG. 1 is an illustrative block diagram of a first embodiment of a distributed computing and communication system having an interconnect coupled to a master device via at least two different connections.

Particular embodiments of the present disclosure are described below with reference to the drawings. In the description, common features are designated by common reference numbers. Referring to FIG. 1, a distributed computing and communication system 100 is illustrated. The distributed computing and communication system 100 includes a first interconnect 102 and a second interconnect 106. The first interconnect 102 is coupled to a first master device 108, to a second master device 112, and to other master devices including a representative fifth master device 116. The first interconnect 102 is coupled to the first master device 108 via a first connection 110 and is coupled to the second master device 112 via a second connection 114. The first interconnect 102 is coupled to the fifth master device 116 via at least two different connections 118 and 120. The fifth master device 116 includes a first sub-master device 122 and a second sub-master device 124 within the fifth master device 116. In a particular embodiment, the fifth master device 116 is a high-throughput master device that demands high throughput. The first master device 108 and the second master device 112 may be master devices that request lower throughput than the high-throughput fifth master device 116, referred to as "standard" master devices. The second interconnect 106 is coupled to a sixth master device 126 and to a seventh master device 128 as shown. In a particular embodiment, the master devices 108, 112, 116, 126, and 128 are processors.

The second interconnect 106 is coupled to the first interconnect 102 via a single link 130. The second interconnect 106 is coupled to a first representative memory device 134 via a first memory controller 138 and is coupled to a second representative memory device 136 via a second memory controller 140. The second interconnect 106 has a first master port 142 coupled to the single link 130. The second interconnect 106 includes a first slave port 146 coupled to the first memory controller 138 and a second slave port 148 coupled to the second memory controller 140. While the second interconnect 106 is shown as coupled to multiple memory devices 134 and 136 via two memory controllers 138 and 140, it should be understood that the second interconnect 106 may be coupled to more than two memory devices via more than two corresponding memory controllers. The master devices 108, 112, and 116 may access the multiple memory devices 134 and 136 via the single link 130. The master devices 126 and 128 may access the multiple memory devices 134 and 136 directly via the second interconnect 106.

The first interconnect 102 is coupled to the first master device 108 via a single connection 110. The first interconnect 102 is coupled to the fifth master device 116 via at least two different connections 118 and 120. While only two connections 118 and 120 are shown, it should be understood that the first interconnect 102 may be coupled to one or more of the master devices via more than two connections. The fifth master device 116 may have a higher throughput than the first master device 108. Thus, multiple different connections connect the fifth master device 116 and the first interconnect 102, whereas only a single connection connects the first master device 108 and the first interconnect 102. A third master device (not shown) and a fourth master device (not shown) may also each be coupled to the first interconnect 102 via a single connection (not shown). There may be six connections coupling the five master devices to the first interconnect 102.

A theoretical maximum throughput of a given master device through the single link 130 is equal to the product of the fraction of time slots on the single link 130 allotted to the given master device with the bus frequency of the single link 130. For example, a theoretical maximum throughput of the first master device 108 through the single link 130, such as to access the memory device 134, is equal to ⅙ times the bus frequency of the single link 130, when the time slots on the single link 130 are equally distributed between the six connections coupling the five master devices to the first interconnect 102. Similarly, a theoretical maximum throughput of the second master device 112 through the single link 130 is equal to ⅙ times the bus frequency of the single link 130. However, a theoretical maximum throughput of the fifth master device 116 through the single link 130 is equal to ⅔ times the bus frequency of the single link 130, because the fifth master device 116 is coupled to the first interconnect 102 via two different connections 118 and 120. Thus, a theoretical maximum throughput of the fifth master device 116 through the single link 130 is twice the theoretical maximum throughput of either the first master device 108 or the second master device 112 through the single link 130.

If the fifth master device 116 were coupled to the first interconnect 102 via only a single connection, a theoretical maximum throughput of all five of the master devices through the single link 130 would be equal to ⅕ times the bus frequency of the single link 130, because the time slots on the single link 130 would be equally distributed between the five connections coupling the five master devices to the first interconnect 102. Adding the extra connection coupling the fifth master device 116 to the first interconnect 102 increases a theoretical maximum throughput of the fifth master device 116 through the single link 130 from ⅕ times the bus frequency of the single link 130 to ⅖ times the bus frequency of the single link 130.

Figure 5:
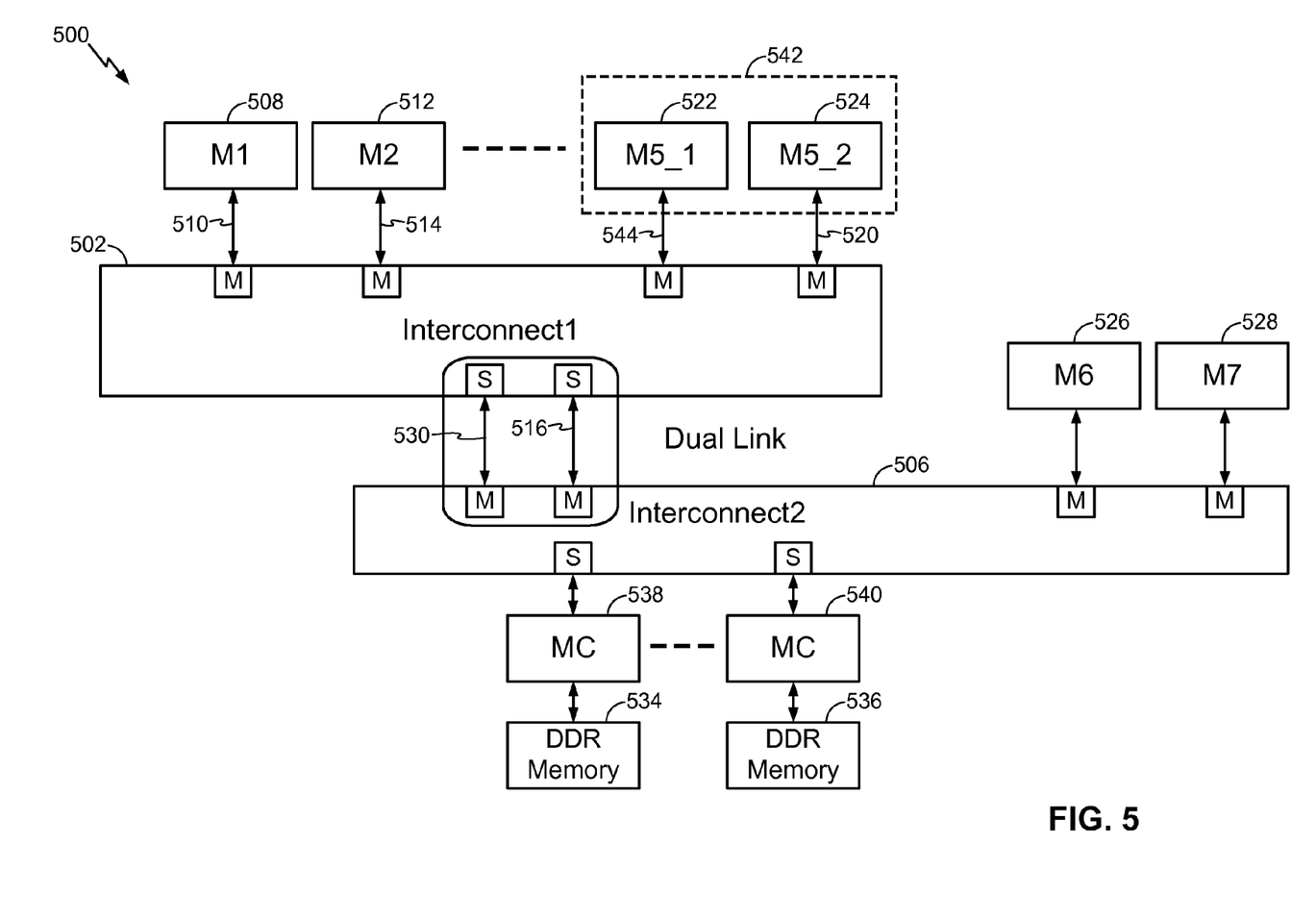
FIG. 5 is an illustrative block diagram of a third embodiment of a distributed computing and communication system having an interconnect coupled to a master device via at least two different connections.

Alternatively, adding another link coupling the first interconnect 102 to the second interconnect 106, such as shown in FIG. 5 and discussed in more detail below, would double a theoretical maximum throughput of all five of the master devices. For example, a theoretical maximum throughput of the fifth master device 116 through the dual links would be ⅖ times the bus frequency of either of the dual links (assuming the bus frequency of both of the dual links is the same), if the fifth master device 116 were coupled to the first interconnect 102 via only a single connection. However, increasing the number of links between interconnects increases the interconnect routing complexity, increases the area taken up by the interconnects as well as the power consumed by the interconnects, and also increases the timing complexity. For example, the routing complexity of the dual link architecture would be 5×2, if the fifth master device 116 were coupled to the first interconnect 102 via only a single connection. In contrast, a theoretical maximum throughput of the fifth master device 116 through the single link 130 is ⅖ times the bus frequency of the single link 130, while the routing complexity of the single link architecture shown in FIG. 1 is only 6×1, with the fifth master device 116 coupled to the first interconnect 102 via the two different connections 118 and 120. In addition, the single link 130 may be configured to run at a higher bus frequency than either of the dual links due to the timing complexity.

In other words, the single link architecture shown in FIG. 1 provides nearly the same theoretical maximum throughput for the fifth master device 116 that a dual link architecture would where the fifth master device 116 is coupled to the first interconnect 102 via only a single connection, but with one fewer link coupling the first interconnect 102 and the second interconnect 106. Increasing the number of connections coupling the fifth master device 116 to the first interconnect 102 may enable reduction of the number of links coupling the first interconnect 102 to the second interconnect 106 while still satisfying the high-throughput demand of the fifth master device 116. In a particular embodiment, the second interconnect 106 is coupled to the first interconnect 102 via at least one fewer link than if the first interconnect 102 were coupled to the fifth master device 116 via a single connection. If the fifth master device 116 were coupled to the first interconnect 102 via only a single connection, the high-throughput demand of the fifth master device 116 would have to be met using the dual link architecture where the second interconnect 106 is coupled to the first interconnect 102 via two links. With the fifth master device 116 coupled to the first interconnect 102 via the two different connections 118 and 120, the high-throughput demand of the fifth master device 116 may be met using the single link architecture shown in FIG. 1 where the second interconnect 106 is coupled to the first interconnect 102 via one link.

Figure 2:
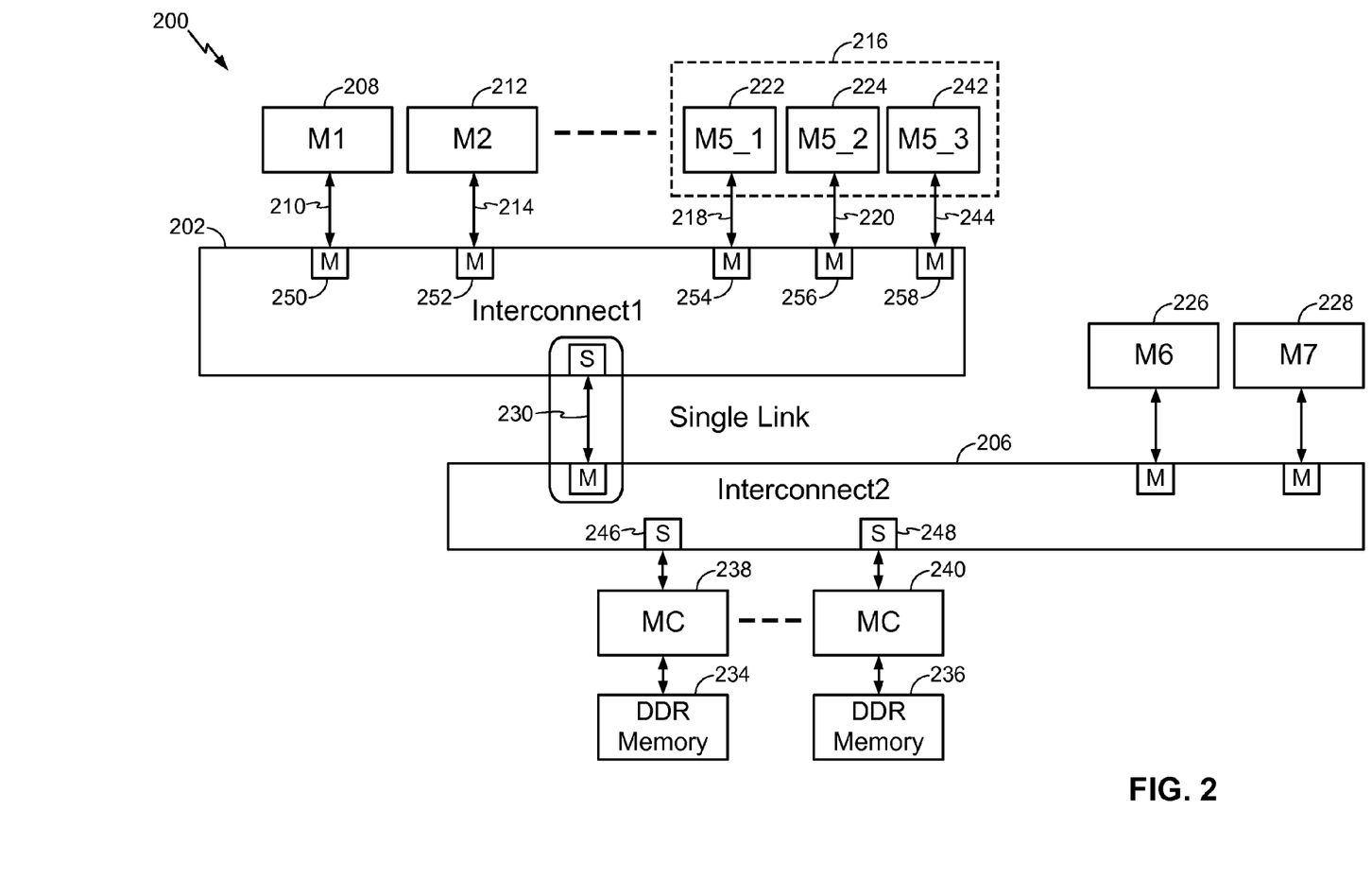
FIG. 2 is an illustrative block diagram of a second embodiment of a distributed computing and communication system having an interconnect coupled to a master device via at least two different connections.

According to FIG. 2, another particular embodiment of a distributed computing and communication system 200 is shown. The distributed computing and communication system 200 includes a first interconnect 202 and a second interconnect 206. The second interconnect 206 is coupled to the first interconnect 202 via a first link 230. The first interconnect 202 includes a plurality of master ports that are coupled to a corresponding plurality of master devices. For example, a first master port 250 of the first interconnect 202 is coupled to a first representative master device 208. A second master port 252 of the first interconnect 202 is coupled to a second representative master device 212. The first interconnect 202 is coupled to the first master device 208 via a first connection 210 and is coupled to the second master device 212 via a second connection 214. Similarly, the first interconnect 202 may be coupled to a master device 216 via a plurality of different connections 218, 220, and 244. The plurality of different connections 218, 220, and 244 are coupled to a plurality of corresponding master ports 254, 256, and 258 of the first interconnect 202 and are coupled to a plurality of sub-master devices 222, 224, and 242 within the master device 216. The second interconnect 206 is coupled to a sixth master device 226 and is coupled to a seventh master device 228.

The second interconnect 206 is coupled via slave ports to multiple memory devices. For example, the second interconnect 206 is coupled to a first memory device 234 via a first slave port 246 and via a first memory controller 238. As another example, the second interconnect 206 may be coupled to a second memory device 236 via a second slave port 248 and via a second memory controller 240.

In the particular embodiment of FIG. 2, the fifth master device 216 includes a plurality of sub-master devices 222, 224, and 242 and has a bandwidth and throughput that is higher than either the first master device 208 or the second master device 212. The fifth master device 216 may be a high-throughput master device and the first master device 208 and the second master device 212 may be standard master devices, for example. The fifth master device 216 is coupled via a plurality of different connections 218, 220, and 244 to the first interconnect 202. With the single link architecture shown in FIG. 2, the second interconnect 206 is coupled to the first interconnect 202 via the first link 230. The second interconnect 206 is coupled to the first interconnect 202 via fewer links than if the first interconnect 206 were coupled via a single connection to the fifth master device 216 due to the high-throughput demands of the fifth master device 216, as described above with respect to FIG. 1. A third master device (not shown) and a fourth master device (not shown) may also each be coupled to the first interconnect 202 via a single connection (not shown). There may be seven connections coupling the five master devices to the first interconnect 202.

A theoretical maximum throughput of a given master device through the first link 230 is equal to the product of the fraction of time slots on the first link 230 allotted to the given master device with the bus frequency of the first link 230. For example, a theoretical maximum throughput of the first master device 208 through the first link 230 may be equal to $1/7$ times the bus frequency of the first link 230, when the time slots on the first link 230 are equally distributed between the seven connections coupling the five master devices to the first interconnect 202. Similarly, a theoretical maximum throughput of the second master device 212 through the first link 230 may be equal to $1/7$ times the bus frequency of the first link 230. However, a theoretical maximum throughput of the fifth master device 216 through the first link 230 is equal to $3/7$ times the bus frequency of the first link 230, because the fifth master device 216 is coupled to the first interconnect 102 via three different connections 218, 220, and 244. Thus, a theoretical maximum throughput of the fifth master device 216 through the first link 230 is three times the theoretical maximum throughput of either the first master device 208 or the second master device 212 through the first link 230.

If the fifth master device 216 were coupled to the first interconnect 202 via only a single connection, a theoretical maximum throughput of all five of the master devices through the first link 230 would be equal to $1/5$ times the bus frequency of the first link 230, when the time slots on the first link 230 would be equally distributed between the five connections coupling the five master devices to the first interconnect 202. Adding the extra connections coupling the fifth master device 216 to the first interconnect 202 increases a theoretical maximum throughput of the fifth master device 216 through the first link 230 from $1/5$ times the bus frequency of the first link 230 to $3/7$ times the bus frequency of the first link 230.

Alternatively, adding another link coupling the first interconnect 202 to the second interconnect 206, such as shown in FIG. 5 and described in more detail below, would double a theoretical maximum throughput of all five of the master devices. For example, a theoretical maximum throughput of the fifth master device 216 through the dual links would be $2/5$ times the bus frequency of either of the dual links (assuming the bus frequency of both of the dual links is the same), if the fifth master device 216 were coupled to the first interconnect 202 via only a single connection. However, increasing the number of links between interconnects increases the interconnect routing complexity, increases the area taken up by the interconnects as well as the power consumed by the interconnects, and also increases the timing complexity. For example, the routing complexity of the dual link architecture would be 5×2, if the fifth master device 216 were coupled to the first interconnect 202 via only a single connection. In contrast, a theoretical maximum throughput of the fifth master device 216 through the first link 230 is $3/7$ times the bus frequency of the first link 230, while the routing complexity of the single link architecture shown in FIG. 2 is only 7×1, with the fifth master device 216 coupled to the first interconnect 202 via the three different connections 218, 220, and 244. In addition, the first link 230 may run at a higher bus frequency than either of the dual links due to the timing complexity.

The single link architecture shown in FIG. 2 therefore provides a greater theoretical maximum throughput for the fifth master device 216 than a dual link architecture would where the fifth master device 216 is coupled to the first interconnect 202 via only a single connection, but with one fewer link coupling the first interconnect 202 and the second interconnect 206. Increasing the number of connections coupling the fifth master device 216 to the first interconnect 202 may enable reduction of the number of links coupling the first interconnect 202 to the second interconnect 206 while still satisfying the high-throughput demand of the fifth master device 216. In a particular embodiment, the second interconnect 206 is coupled to the first interconnect 202 via at least one fewer link than if the first interconnect 202 were coupled to the fifth master device 216 via a single connection. If the fifth master device 216 were coupled to the first interconnect 202 via only a single connection, the high-throughput demand of the fifth master device 216 would have to be met using the dual link architecture where the second interconnect 206 is coupled to the first interconnect 202 via two links. With the fifth master device 216 coupled to the first interconnect 202 via the three different connections 218, 220, and 244, the high-throughput demand of the fifth master device 216 may be met using the single link architecture shown in FIG. 2, where the second interconnect 206 is coupled to the first interconnect 202 via one link.

Figure 3:
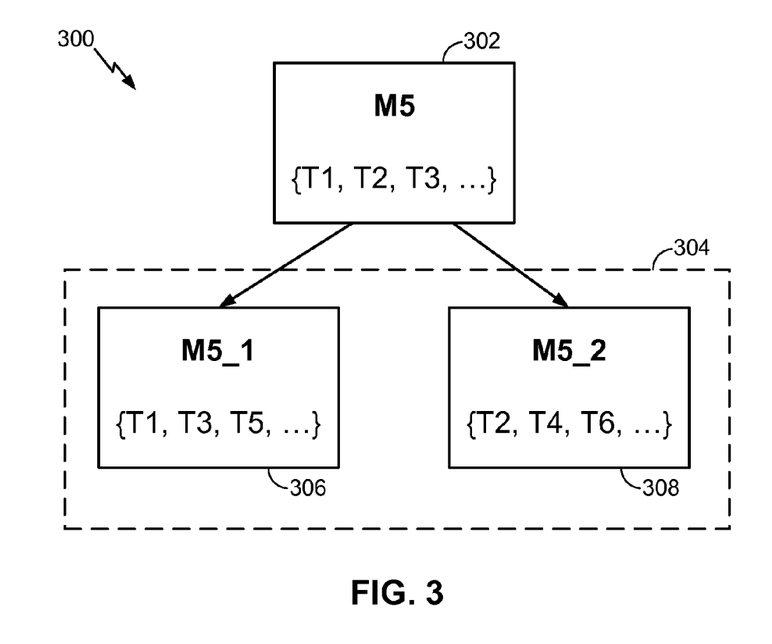
FIG. 3 is an illustrative block diagram of a first embodiment of partitioning a master device into sub-master devices.

Referring to FIG. 3, an illustrative embodiment of a method 300 of partitioning a representative master device is shown. A representative master device 302 includes a plurality of tasks that are to be performed, such as making data requests that may be communicated to a memory device. For example, the master device 302 may have representative tasks {T1, T2, T3, . . . } that are to be performed. The master device 302 may be partitioned to create an updated master device 304, such as the fifth master device 116 of FIG. 1 and the fifth master device 216 of FIG. 2. The updated master device 304 includes a first sub-master device 306 and a second sub-master device 308. The first sub-master device 306 is assigned a plurality of odd tasks {T1, T3, T5, . . . } and the second sub-master device 308 is assigned a plurality of even tasks {T2, T4, T6, . . . }. Thus, the updated master device 304 includes the sub-master devices 306 and 308, which in turn perform respective parts of the tasks of the master device 302, for example, sending respective data requests to other devices.

Figure 4:
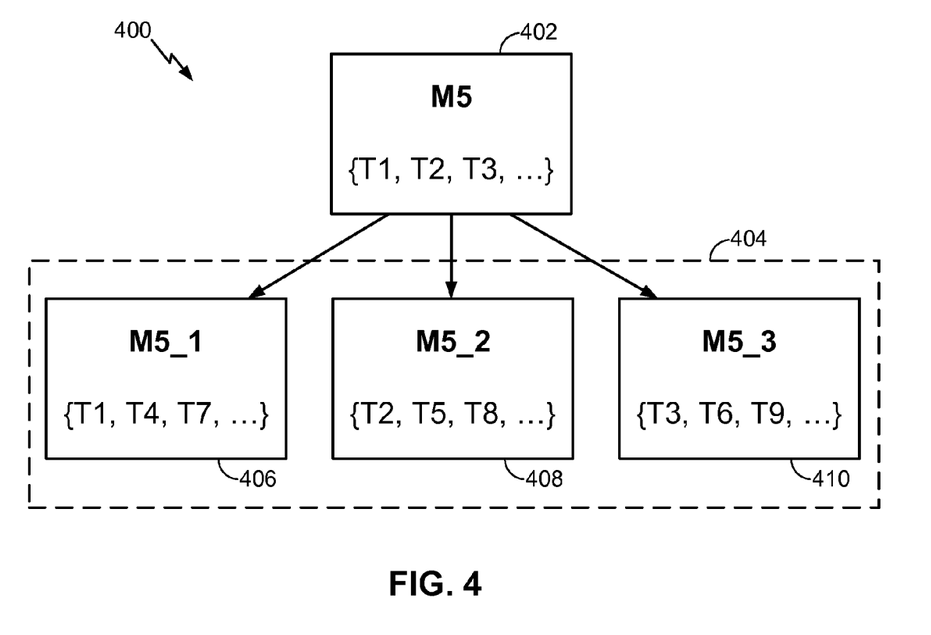
FIG. 4 is an illustrative block diagram of a second embodiment of partitioning a master device into sub-master devices.

Referring to FIG. 4, another illustrative embodiment of a method 400 of partitioning a representative master device is shown. A representative master device 402 includes a plurality of tasks that are to be performed, such as making data requests that may be communicated to a memory device. For example, the master device 402 may have representative tasks {T1, T2, T3, . . . } that are to be performed. The master device 402 may be partitioned to create an updated master device 404, such as the fifth master device 116 of FIG. 1 and the fifth master device 216 of FIG. 2. The updated master device 404 includes a first sub-master device 406, a second sub-master device 408, and a third sub-master device 410. The first sub-master device 406 is assigned a first plurality of tasks {T1, T4, T7, . . . }, the second sub-master device 408 is assigned a second plurality of tasks {T2, T5, T8, . . . }, and the third sub-master 410 is assigned a third plurality of tasks {T3, T6, T9, . . . }. Thus, the updated master device 404 includes the sub-master devices 406, 408, and 410, which in turn perform respective parts of the tasks of the master device 402, for example, sending respective data requests to other devices.

In a particular embodiment, the master device 402 is a processor and the representative tasks {T1, T2, T3, . . . } that are to be performed are processing requests. Thus, the processing requests may be divided among each of the sub-master devices 406, 408, and 410, as shown in FIG. 4. In a particular illustrative embodiment, each of the sub-master devices 406, 408, and 410 may be assigned a specific master port for communication over a dedicated connection to an interconnection device. For example, the first sub-master device 406 may be connected to the first interconnect 202 of FIG. 2 via the first connection 218, the second sub-master device 408 may be connected via the second connection 220 to the first interconnect 202 and the third sub-master device 410 may be connected via the third connection 244 to the first interconnect 202. The partitioning methods 300 and 400 may be generalized to any number N of sub-master devices, where N is an integer greater than one.

Referring to FIG. 5, another embodiment of a distributed computing and communication system 500 is illustrated. The distributed computing and communication system 500 includes a first interconnect 502 and a second interconnect 506. The first interconnect 502 is coupled to a first master device 508, to a second master device 512, and to other master devices including a representative fifth master device 542. The first interconnect 502 is coupled to the first master device 508 via a first connection 510 and is coupled to the second master device 512 via a second connection 514. The first interconnect 502 is coupled to the fifth master device 542 via at least two different connections 544 and 520. The fifth master device 542 includes a first sub-master device 522 and a second sub-master 524 within the fifth master device 542. In a particular embodiment, the fifth master device 542 is a high-throughput master device that demands high throughput. The first master device 508 and the second master device 512 may be standard master devices requesting lower throughput. The second interconnect 506 is coupled to a sixth master device 526 and to a seventh master device 528 as shown.

The second interconnect 506 is coupled to the first interconnect 502 via dual links 530 and 516. The second interconnect 506 is coupled to a first representative memory device 534 via a first memory controller 538 and is coupled to a second representative memory device 536 via a second memory controller 540.

In the particular embodiment of FIG. 5, the fifth master device 542 includes a plurality of sub-master devices 522 and 524 and has a bandwidth and throughput that is higher than either the first master device 508 or the second master device 512. The fifth master device 542 may be a high-throughput master device and the first master device 508 and the second master device 512 may be standard master devices, for example. The fifth master device 542 is coupled via a plurality of different connections 544 and 520 to the first interconnect 502. With the dual link architecture shown in FIG. 5, the second interconnect 506 is coupled to the first interconnect 502 via a first link 530 and a second link 516. The second interconnect 506 is coupled to the first interconnect 502 via fewer links than if the first interconnect 506 were coupled via a single connection to the fifth master device 542 due to the high-throughput demands of the fifth master device 542, as described above with respect to FIG. 1. A third master device (not shown) and a fourth master device (not shown) may also each be coupled to the first interconnect 502 via a single connection (not shown). There may be six connections coupling the five master devices to the first interconnect 502.

A theoretical maximum throughput of a given master device through the first link 530 is equal to the product of the fraction of time slots on the first link 530 allotted to the given master device with the bus frequency of the first link 530. For example, a theoretical maximum throughput of the first master device 508 through the first link 530 is equal to ⅙ times the bus frequency of the first link 530, because the time slots on the first link 530 are equally distributed between the six connections coupling the five master devices to the first interconnect 502. Similarly, a theoretical maximum throughput of the second master device 512 through the first link 530 is equal to ⅙ times the bus frequency of the first link 530. However, a theoretical maximum throughput of the fifth master device 542 through the first link 530 is equal to ⅔ times the bus frequency of the first link 530, because the fifth master device 542 is coupled to the first interconnect 502 via two different connections 544 and 520. Thus, a theoretical maximum throughput of the fifth master device 542 through the first link 530 is twice the theoretical maximum throughput of either the first master device 508 or the second master device 512 through the first link 530.

If the fifth master device 542 were coupled to the first interconnect 502 via only a single connection, a theoretical maximum throughput of all five of the master devices through the first link 530 would be equal to ⅕ times the bus frequency of the first link 530, because the time slots on the first link 530 would be equally distributed between the five connections coupling the five master devices to the first interconnect 502. Adding the extra connection coupling the fifth master device 542 to the first interconnect 502 increases a theoretical maximum throughput of the fifth master device 542 through the first link 530 from ⅕ times the bus frequency of the first link 530 to ⅔ times the bus frequency of the first link 530.

Adding the second link 516 coupling the first interconnect 502 to the second interconnect 506 doubles a theoretical maximum throughput of all five of the master devices. For example, a theoretical maximum throughput of the fifth master device 542 through the dual links 530 and 516 would be ⁴⁄₆ times the bus frequency of either of the dual links 530 and 516 (assuming the bus frequency of both of the dual links 530 and 516 is the same). Similarly, a theoretical maximum throughput of the fifth master device 542 through the dual links 530 and 516 would be ⅖ times the bus frequency of either of the dual links 530 and 516 (again assuming the bus frequency of both of the dual links 530 and 516 is the same), if the fifth master device 542 were coupled to the first interconnect 502 via only a single connection.

Alternatively, adding a third link coupling the first interconnect 502 to the second interconnect 506 would triple a theoretical maximum throughput of all five of the master devices. For example, a theoretical maximum throughput of the fifth master device 542 through the triple links would be ⅗ times the bus frequency of any of the triple links (assuming the bus frequency of all of the triple links is the same), if the fifth master device 542 were coupled to the first interconnect 502 via only a single connection. However, increasing the number of links between interconnects increases the interconnect routing complexity, increases the area taken up by the interconnects as well as the power consumed by the interconnects, and also increases the timing complexity. For example, the routing complexity of the triple link architecture would be 5×3, if the fifth master device 542 were coupled to the first interconnect 502 via only a single connection. In contrast, a theoretical maximum throughput of the fifth master device 542 through the first link 530 and the second link 516 is 4/6 times the bus frequency of the first link 530 (assuming the bus frequency of the first link 530 is the same as the bus frequency of the second link 516), while the routing complexity of the dual link architecture shown in FIG. 5 is only 6×2, with the fifth master device 542 coupled to the first interconnect 502 via the two different connections 544 and 520. In addition, the first link 530 and the second link 516 may run at a higher bus frequencies than any of the triple links due to the timing complexity.

The dual link architecture shown in FIG. 5 therefore provides a greater theoretical maximum throughput for the fifth master device 542 than a triple link architecture where the fifth master device 542 is coupled to the first interconnect 502 via only a single connection, but with one fewer link coupling the first interconnect 502 and the second interconnect 506. Increasing the number of connections coupling the fifth master device 542 to the first interconnect 502 may enable reduction of the number of links coupling the first interconnect 502 to the second interconnect 506 while still satisfying the high-throughput demand of the fifth master device 542. In a particular embodiment, the second interconnect 506 is coupled to the first interconnect 502 via at least one fewer link than if the first interconnect 502 were coupled to the fifth master device 542 via a single connection. If the fifth master device 542 were coupled to the first interconnect 502 via only a single connection, the high-throughput demand of the fifth master device 542 would have to be met using the triple link architecture where the second interconnect 506 is coupled to the first interconnect 502 via three links. With the fifth master device 542 coupled to the first interconnect 502 via the two different connections 518 and 520, the high-throughput demand of the fifth master device 542 may be met using the dual link architecture shown in FIG. 5 where the second interconnect 506 is coupled to the first interconnect 502 via two links.

Figure 6:
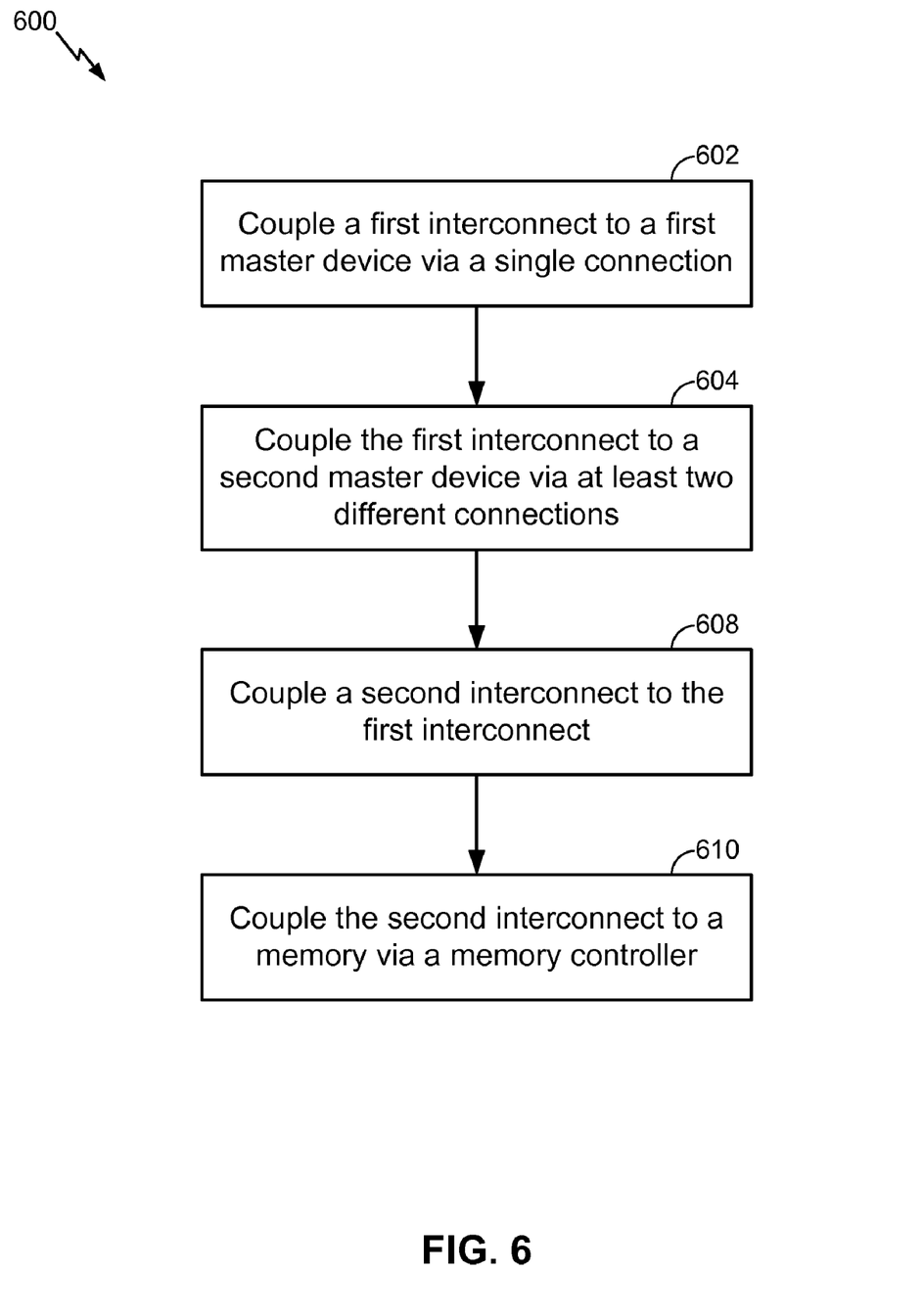
FIG. 6 is a flow diagram of an illustrative embodiment of a method of forming a distributed computing and communication system having an interconnect coupled to a master device via at least two different connections.

Although FIGS. 1, 2, and 5 depict five master devices coupled to the first interconnect 102, 202, and 502 and two master devices coupled to the second interconnect 106, 206, and 506, any number of master devices may be coupled to the first interconnect 102, 202, and 502 and any number of master devices may be coupled to the second interconnect 106, 206, and 506. Referring to FIG. 6, a particular embodiment of a method 600 of providing interconnections between master devices and memory devices is illustrated. The method 600 includes coupling a first interconnect to a first master device via a single connection, at 602. For example, the first interconnect 102 of FIG. 1 may be coupled to the first master device 108 via the single connection 110. Similarly, the first interconnect 202 of FIG. 2 may be coupled to the first master device 208 via the single connection 210. Likewise, the first interconnect 502 of FIG. 5 may be coupled to the first master device 508 via the single connection 510.

The method 600 further includes coupling the first interconnect to a second master device via at least two different connections, at 604. For example, the first interconnect 102 of FIG. 1 may be coupled to the fifth master device 116 via the two different connections 118 and 120. Similarly, the first interconnect 202 of FIG. 2 may be coupled to the fifth master device 216 via the three different connections 218, 220, and 244. Likewise, the first interconnect 502 of FIG. 5 may be coupled to the first master device 542 via the two different connections 544 and 520.

The method 600 further includes coupling a second interconnect to the first interconnect, at 608. For example, the second interconnect 106 of FIG. 1 may be coupled to the first interconnect 102 via the single link 130. Similarly, the second interconnect 206 of FIG. 2 may be coupled to the first interconnect 202 via the single link 230. Likewise, the second interconnect 506 of FIG. 5 may be coupled to the first interconnect 502 via the dual links 530 and 516.

The method 600 further includes coupling the second interconnect to a memory via a memory controller, at 610. For example, the second interconnect 106 of FIG. 1 may be coupled to the memory 134 via the memory controller 138. Similarly, the second interconnect 206 of FIG. 2 may be coupled to the memory 234 via the memory controller 238. Likewise, the second interconnect 506 of FIG. 5 may be coupled to the memory 534 via the memory controller 538.

In a particular embodiment, the second interconnect is coupled to multiple memory devices via multiple memory controllers as shown with respect to FIG. 1, FIG. 2, and FIG. 5. For example, the second interconnect 106 of FIG. 1 may be coupled to the multiple memory devices 134 and 136 via the multiple memory controllers 138 and 140, respectively. Similarly, the second interconnect 206 of FIG. 2 may be coupled to the multiple memory devices 234 and 236 via the multiple memory controllers 238 and 240, respectively. Likewise, the second interconnect 506 of FIG. 5 may be coupled to the multiple memory devices 534 and 536 via the multiple memory controllers 538 and 540, respectively.

In a particular embodiment, the second master device has a higher throughput than the first master device. For example, the fifth master device 116 of FIG. 1 may have a higher throughput than the first master device 108. Similarly, the fifth master device 216 of FIG. 2 may have a higher throughput than the first master device 208. Likewise, the fifth master device 542 of FIG. 5 may have a higher throughput than the first master device 508.

In a particular embodiment, the first master device and the second master device include processors. For example, both the first master device 108 of FIG. 1 and the fifth master device 116 may include processors. Similarly, both the first master device 208 of FIG. 2 and the fifth master device 216 may include processors. Likewise, both the first master device 508 of FIG. 5 and the fifth master device 542 may include processors.

In a particular embodiment, the second interconnect is coupled to the first interconnect via at least one fewer link than if the first interconnect were coupled to the second master device via a single connection. For example, the second interconnect 106 of FIG. 1 is coupled to the first interconnect 102 via at least one fewer link than if the first interconnect 102 were coupled to the fifth master device 116 via a single connection while still satisfying the high-throughput demand of the fifth master device 116. Similarly, the second interconnect 206 of FIG. 2 is coupled to the first interconnect 202 via at least one fewer link than if the first interconnect 202 were coupled to the fifth master device 216 via a single connection while still satisfying the high-throughput demand of the fifth master device 216. Likewise, the second interconnect 506 of FIG. 5 is coupled to the first interconnect 502 via at least one fewer link than if the first interconnect 502 were coupled to the fifth master device 542 via a single connection while still satisfying the high-throughput demand of the fifth master device 542.

In a particular embodiment, the second interconnect is coupled to the first interconnect via a single link. For example, the second interconnect 106 of FIG. 1 is coupled to the first interconnect 102 via the single link 130. Similarly, the second interconnect 206 of FIG. 2 is coupled to the first interconnect 202 via the single link 230.

Coupling a first interconnect to a first master device via a single connection, coupling the first interconnect to a second master device via at least two different connections, coupling a second interconnect to the first interconnect, coupling the second interconnect to a memory via a memory controller, or any combination thereof, may be initiated at a processor integrated into an electronic device. For example, as will be described with respect to FIG. 8, coupling a first interconnect to a first master device via a single connection, coupling the first interconnect to a second master device via at least two different connections, coupling a second interconnect to the first interconnect, coupling the second interconnect to a memory via a memory controller, or any combination thereof, may be initiated by a computer or other electronic device manufactured using a fabrication process 828. Alternatively, or in addition, one of skill in the art will recognize that the method 600 of FIG. 6 may be implemented or initiated by a field programmable gate array (FPGA), an application-specific integrated circuit (ASIC), a central processing unit (CPU), a digital signal processor (DSP), a controller, another hardware device, or any combination thereof.

Figure 7:
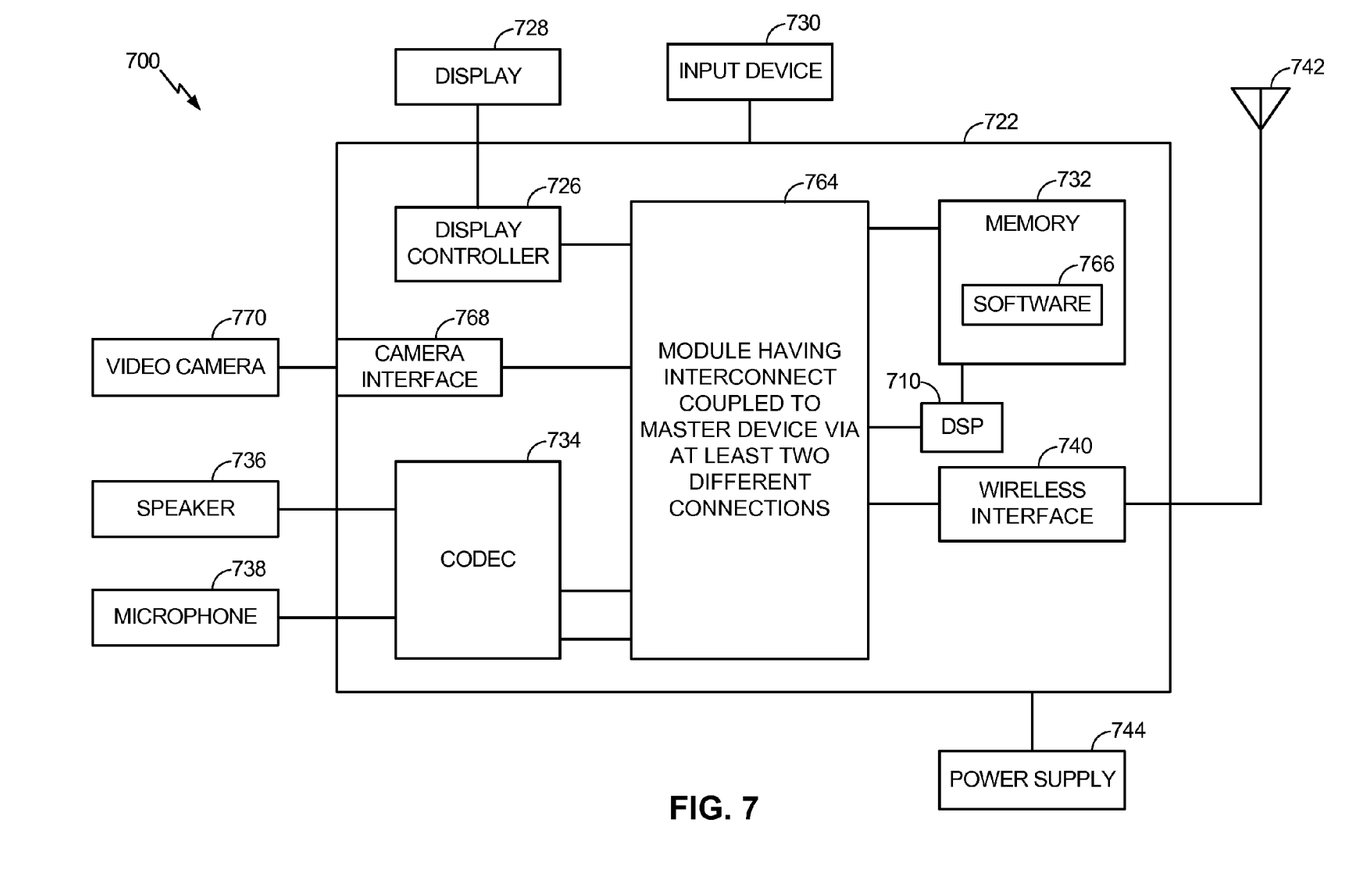
FIG. 7 is a block diagram of a particular embodiment of a wireless communication device including a module having an interconnect coupled to a master device via at least two different connections.

FIG. 7 is a block diagram of particular embodiment of a system 700 including a module having an interconnect coupled to a master device via at least two different connections 764. The system 700 may be implemented in a portable electronic device and includes a processor 710, such as a digital signal processor (DSP), coupled to computer readable medium, such as a memory 732, storing computer readable instructions, such as software 766. The system 700 includes the module having an interconnect coupled to a master device via at least two different connections 764. In an illustrative example, the module having an interconnect coupled to a master device via at least two different connections 764 includes any of the embodiments of an interconnect coupled to a master device via at least two different connections of FIG. 1, FIG. 2, or FIG. 5, produced in accordance with the embodiment of FIG. 6, or any combination thereof. The processor 710 may be in the module having an interconnect coupled to a master device via at least two different connections 764 (not shown) or may be a separate device or circuitry as shown. In a particular embodiment, as shown in FIG. 7, the module having an interconnect coupled to a master device via at least two different connections 764 is accessible to the digital signal processor (DSP) 710. In another particular embodiment, the module having an interconnect coupled to a master device via at least two different connections 764 may include the memory 732.

A camera interface 768 is coupled to the module having an interconnect coupled to a master device via at least two different connections 764 and also coupled to a camera, such as a video camera 770. A display controller 726 is coupled to the module having an interconnect coupled to a master device via at least two different connections 764 and to a display device 728. A coder/decoder (CODEC) 734 can also be coupled to the module having an interconnect coupled to a master device via at least two different connections 764. A speaker 736 and a microphone 738 can be coupled to the CODEC 734. A wireless interface 740 can be coupled to the module having an interconnect coupled to a master device via at least two different connections 764 and to a wireless antenna 742.

In a particular embodiment, the module having an interconnect coupled to a master device via at least two different connections 764, the processor 710, the display controller 726, the memory 732, the CODEC 734, the wireless interface 740, and the camera interface 768 are included in a system-in-package or system-on-chip device 722. In a particular embodiment, an input device 730 and a power supply 744 are coupled to the system-on-chip device 722. Moreover, in a particular embodiment, as illustrated in FIG. 7, the display device 728, the input device 730, the speaker 736, the microphone 738, the wireless antenna 742, the video camera 770, and the power supply 744 are external to the system-on-chip device 722. However, each of the display device 728, the input device 730, the speaker 736, the microphone 738, the wireless antenna 742, the video camera 770, and the power supply 744 can be coupled to a component of the system-on-chip device 722, such as an interface or a controller.

Figure 8:
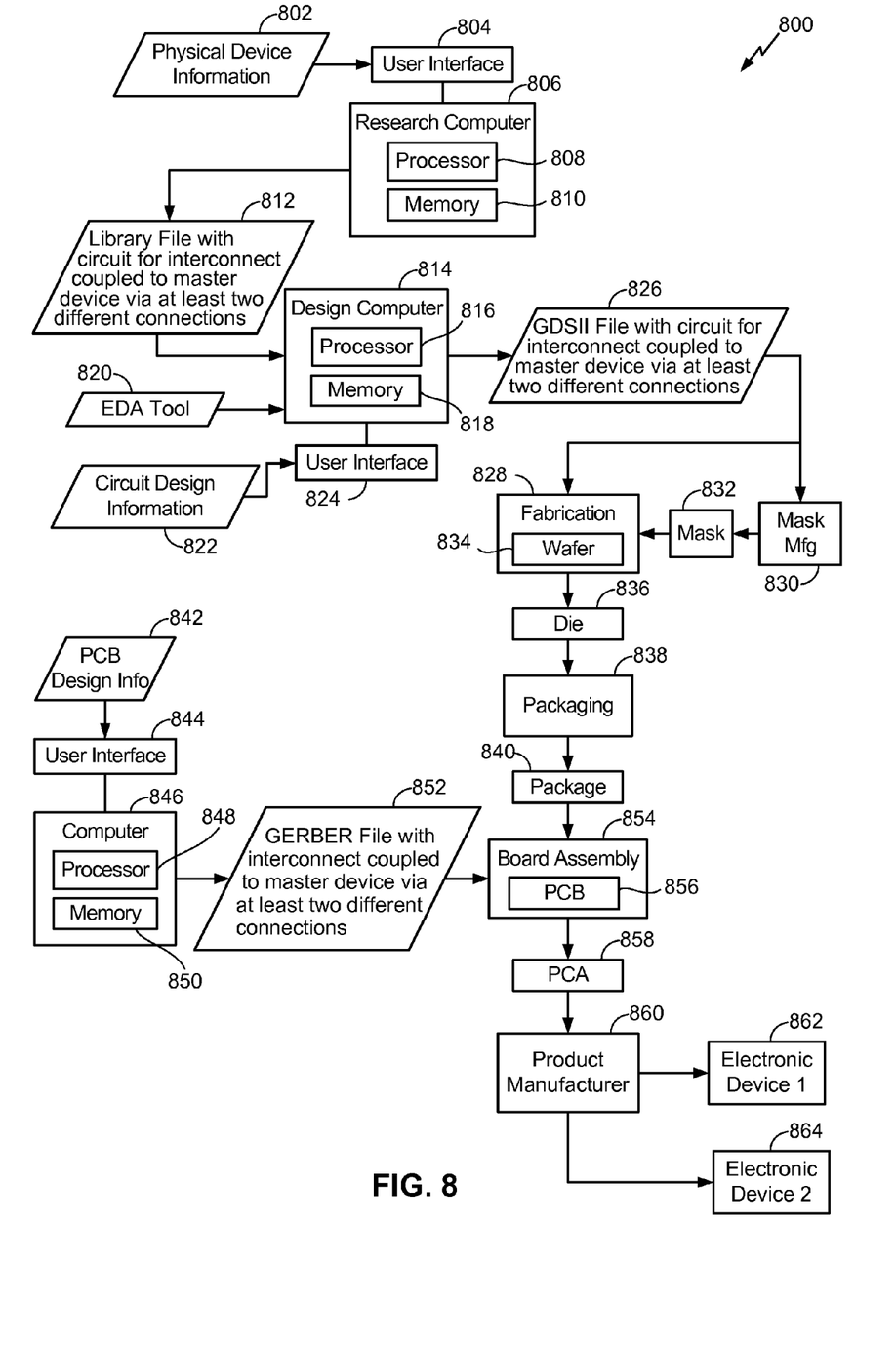
FIG. 8 is a data flow diagram illustrating a manufacturing process for use with an interconnect coupled to a master device via at least two different connections.

The foregoing disclosed devices and functionalities (such as the devices of FIG. 1, FIG. 2, or FIG. 5, the method of FIG. 6, or any combination thereof) may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The semiconductor chips are then employed in electronic devices. FIG. 8 depicts a particular illustrative embodiment of an electronic device manufacturing process 800.

Physical device information 802 is received in the manufacturing process 800, such as at a research computer 806. The physical device information 802 may include design information representing at least one physical property of a semiconductor device, such as the distributed computing and communication system 100 of FIG. 1, the distributed computing and communication system 200 of FIG. 2, or the distributed computing and communication system 500 of FIG. 5. For example, the physical device information 802 may include physical parameters, material characteristics, and structure information that is entered via a user interface 804 coupled to the research computer 806. The research computer 806 includes a processor 808, such as one or more processing cores, coupled to a computer readable medium such as a memory 810. The memory 810 may store computer readable instructions that are executable to cause the processor 808 to transform the physical device information 802 to comply with a file format and to generate a library file 812.

In a particular embodiment, the library file 812 includes at least one data file including the transformed design information. For example, the library file 812 may include a library of semiconductor devices including the distributed computing and communication system 100 of FIG. 1, the distributed computing and communication system 200 of FIG. 2, or the distributed computing and communication system 500 of FIG. 5, that is provided for use with an electronic design automation (EDA) tool 820.

The library file 812 may be used in conjunction with the EDA tool 820 at a design computer 814 including a processor 816, such as one or more processing cores, coupled to a memory 818. The EDA tool 820 may be stored as processor executable instructions at the memory 818 to enable a user of the design computer 814 to design a circuit including the distributed computing and communication system 100 of FIG. 1, the distributed computing and communication system 200 of FIG. 2, or the distributed computing and communication system 500 of FIG. 5, of the library file 812. For example, a user of the design computer 814 may enter circuit design information 822 via a user interface 824 coupled to the design computer 814. The circuit design information 822 may include design information representing at least one physical property of a semiconductor device, such as the distributed computing and communication system 100 of FIG. 1, the distributed computing and communication system 200 of FIG. 2, or the distributed computing and communication system 500 of FIG. 5. To illustrate, the circuit design property may include identification of particular circuits and relationships to other elements in a circuit design, positioning information, feature size information, interconnection information, or other information representing a physical property of a semiconductor device.

The design computer 814 may be configured to transform the design information, including the circuit design information 822, to comply with a file format. To illustrate, the file formation may include a database binary file format representing planar geometric shapes, text labels, and other information about a circuit layout in a hierarchical format, such as a Graphic Data System (GDSII) file format. The design computer 814 may be configured to generate a data file including the transformed design information, such as a GDSII file 826 that includes information describing the distributed computing and communication system 100 of FIG. 1, the distributed computing and communication system 200 of FIG. 2, or the distributed computing and communication system 500 of FIG. 5, in addition to other circuits or information. To illustrate, the data file may include information corresponding to a system-on-chip (SOC) that includes the distributed computing and communication system 100 of FIG. 1, the distributed computing and communication system 200 of FIG. 2, or the distributed computing and communication system 500 of FIG. 5 and that also includes additional electronic circuits and components within the SOC.

The GDSII file 826 may be received at a fabrication process 828 to manufacture the distributed computing and communication system 100 of FIG. 1, the distributed computing and communication system 200 of FIG. 2, or the distributed computing and communication system 500 of FIG. 5, according to transformed information in the GDSII file 826. For example, a device manufacture process may include providing the GDSII file 826 to a mask manufacturer 830 to create one or more masks, such as masks to be used for photolithography processing, illustrated as a representative mask 832. The mask 832 may be used during the fabrication process to generate one or more wafers 834, which may be tested and separated into dies, such as a representative die 836. The die 836 includes the distributed computing and communication system 100 of FIG. 1, the distributed computing and communication system 200 of FIG. 2, or the distributed computing and communication system 500 of FIG. 5.

The die 836 may be provided to a packaging process 838 where the die 836 is incorporated into a representative package 840. For example, the package 840 may include multiple dies 836, such as the multi-die device 100 of FIG. 1, the multi-die device 300 of FIG. 3, the multi-die device 400 of FIG. 4, or a system-in-package (SiP) arrangement, or any combination thereof. The package 840 may be configured to conform to one or more standards or specifications, such as Joint Electron Device Engineering Council (JEDEC) standards. The packaging process 838 may include a processor coupled to a computer-readable tangible medium storing instructions executable by a computer. The processor may be integrated into an electronic device, such as a computer or an electronic packaging device. Execution at the packaging process 838 of the instructions stored in the computer-readable tangible medium may result in the package 840 including the die 836, such as the distributed computing and communication system 100 of FIG. 1, the distributed computing and communication system 200 of FIG. 2, or the distributed computing and communication system 500 of FIG. 5, or any combination thereof.

Information regarding the package 840 may be distributed to various product designers, such as via a component library stored at a computer 846. The computer 846 may include a processor 848, such as one or more processing cores, coupled to a memory 850. A printed circuit board (PCB) tool may be stored as processor executable instructions at the memory 850 to process PCB design information 842 received from a user of the computer 846 via a user interface 844. The PCB design information 842 may include physical positioning information of a packaged semiconductor device on a circuit board, the packaged semiconductor device corresponding to the package 840 including the distributed computing and communication system 100 of FIG. 1, the distributed computing and communication system 200 of FIG. 2, or the distributed computing and communication system 500 of FIG. 5.

The computer 846 may be configured to transform the PCB design information 842 to generate a data file, such as a GERBER file 852 with data that includes physical positioning information of a packaged semiconductor device on a circuit board, as well as layout of electrical connections such as traces and vias, where the packaged semiconductor device corresponds to the package 840 including the distributed computing and communication system 100 of FIG. 1, the distributed computing and communication system 200 of FIG. 2, or the distributed computing and communication system 500 of FIG. 5. In other embodiments, the data file generated by the transformed PCB design information may have a format other than a GERBER format.

The GERBER file 852 may be received at a board assembly process 854 and used to create PCBs, such as a representative PCB 856, manufactured in accordance with the design information stored within the GERBER file 852. For example, the GERBER file 852 may be uploaded to one or more machines for performing various steps of a PCB production process. The PCB 856 may be populated with electronic components including the package 840 to form a representative printed circuit assembly (PCA) 858.

The PCA 858 may be received at a product manufacture process 860 and integrated into one or more electronic devices, such as a first representative electronic device 862 and a second representative electronic device 864. As an illustrative, non-limiting example, the first representative electronic device 862, the second representative electronic device 864, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 862 and 864 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 8 illustrates remote units according to teachings of the disclosure, the disclosure is not limited to these exemplary illustrated units. Embodiments of the disclosure may be suitably employed in any device which includes active integrated circuitry including memory and on-chip circuitry.

Thus, the distributed computing and communication system 100 of FIG. 1, the distributed computing and communication system 200 of FIG. 2, or the distributed computing and communication system 500 of FIG. 5, may be fabricated, processed, and incorporated into an electronic device, as described in the illustrative process 800. One or more aspects of the embodiments disclosed with respect to FIGS. 1-6 may be included at various processing stages, such as within the library file 812, the GDSII file 826, and the GERBER file 852, as well as stored at the memory 810 of the research computer 806, the memory 818 of the design computer 814, the memory 850 of the computer 846, the memory of one or more other computers or processors (not shown) used at the various stages, such as at the board assembly process 854, and also incorporated into one or more other physical embodiments such as the mask 832, the die 836, the package 840, the PCA 858, other products such as prototype circuits or devices (not shown), or any combination thereof. For example, the GDSII file 826 or the fabrication process 828 can include a computer readable tangible medium storing instructions executable by a computer, the instructions including instructions that are executable by the computer to initiate formation of the distributed computing and communication system 100 of FIG. 1, the distributed computing and communication system 200 of FIG. 2, or the distributed computing and communication system 500 of FIG. 5. Although various representative stages of production from a physical device design to a final product are depicted, in other embodiments fewer stages may be used or additional stages may be included. Similarly, the process 800 may be performed by a single entity, or by one or more entities performing various stages of the process 800.

Those of skill would further appreciate that the various illustrative logical blocks, configurations, modules, circuits, and method steps described in connection with the embodiments disclosed herein may be implemented as electronic hardware, computer software executed by a processing unit, or combinations of both. Various illustrative components, blocks, configurations, modules, circuits, and steps have been described above generally in terms of their functionality. Whether such functionality is implemented as hardware or executable processing instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), a magnetoresistive random access memory (MRAM), a spin-torque-transfer magnetoresistive random access memory (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system comprising:
 a first interconnect;
 a second interconnect coupled to the first interconnect;
 wherein the first interconnect is coupled to a first master device via a single bidirectional connection and the first interconnect is coupled to a second master device via at least two different bidirectional connections;
 wherein the second interconnect is coupled to the first master device and the second master device via the first interconnect; and
 wherein the second interconnect is coupled to a memory via a memory controller.

2. The system of claim 1, wherein the second master device has a higher throughput than the first master device.

3. The system of claim 1, wherein the first master device and the second master device comprise processors, wherein the first master device is directly coupled to the first interconnect via the single bidirectional connection, and wherein the second master device is directly coupled to the first interconnect via the at least two different bidirectional connections.

4. The system of claim 1, wherein the second interconnect is coupled to the first interconnect via at least one fewer link than if the first interconnect were coupled to the second master device via a single connection.

5. The system of claim 1, wherein the second interconnect is coupled to the first interconnect via a single bidirectional link.

6. The system of claim 1, wherein the second interconnect is coupled to multiple memory devices.

7. A method comprising:
 coupling a first interconnect to a first master device via a single bidirectional connection;
 coupling the first interconnect to a. second master device via at least two different bidirectional connections;
 coupling a second interconnect to the first interconnect, wherein the second interconnect is coupled to the first master device and the second master device via the first interconnect; and coupling the second interconnect to a memory via a memory controller.

8. The method of claim 7, wherein the second master device has a higher throughput than the first master device.

9. The method of claim 7, wherein the first master device and the second master device comprise processors.

10. The method of claim 7, wherein the second interconnect is coupled to the first interconnect via at least one fewer link than if the first interconnect were coupled to the second master device via a single connection.

11. The method of claim 7, wherein the second interconnect is coupled to the first interconnect via a single bidirectional link.

12. The method of claim 7, wherein the second interconnect is coupled to multiple memory devices.

13. The method of claim 7, wherein coupling the first interconnect to the first master device via the single bidirectional connection, coupling the first interconnect to the second master device via the at least two different bidirectional connections, coupling the second interconnect to the first interconnect, and coupling the second interconnect to the memory via the memory controller are initiated by a processor integrated into an electronic device.

14. A method comprising:
a first step for coupling a first interconnect to a first master device via a single bidirectional connection;
a second step for coupling the first interconnect to a second master device via at least two different bidirectional connections;
a third step for coupling a second interconnect to the first interconnect, wherein the second interconnect is coupled to the first master device and the second master device via the first interconnect; and
a fourth step for coupling the second interconnect a memory via a memory controller.

15. A method comprising:
receiving design information representing at least one physical property of a semiconductor device, the semiconductor device comprising:
a first interconnect coupled to a second interconnect having an interface to a memory controller,
wherein the first interconnect is coupled a first master device via a single bidirectional connection and the first interconnect is coupled to a second master device via at least two different bidirectional connections;
transforming the design information to comply with a file format; and
generating a data file comprising the transformed design information.

16. The method of claim 15, wherein the data file comprises a GDSII format.

17. A method comprising:
receiving a data file comprising design information corresponding to a semiconductor device; and
fabricating the semiconductor device according to the design information, wherein the semiconductor device comprises:
a first interconnect coupled to a second interconnect having an interface to a memory controller,
wherein the first interconnect is coupled to a first master device via a single bidirectional connection and the first interconnect is coupled to a second master device via at least two different bidirectional connections.

18. The method of claim 17, wherein the data file comprises a GDSII format.

19. A method comprising:
receiving design information comprising physical positioning information of a packaged semiconductor device on a circuit board, the packaged semiconductor device comprising a semiconductor structure comprising:
a first interconnect coupled to a second interconnect having an interface to a memory controller,
wherein the first interconnect is coupled to a first master device via a single bidirectional connection and the first interconnect is coupled to a second master device via at least two different bidirectional connections; and
transforming the design information to generate a data file.

20. The method of claim 19, wherein the data file comprises a GERBER format.

21. A method comprising:
receiving a data file comprising design information comprising physical positioning information of a packaged semiconductor device on a circuit board; and
manufacturing the circuit board configured to receive the packaged semiconductor device according to the design information, wherein the packaged semiconductor device comprises a semiconductor structure comprising:
a first interconnect coupled to a second interconnect having an interface to a memory controller,
wherein the first interconnect is coupled to a first master device via a single bidirectional connection and the first interconnect is coupled to a second master device via at least two different bidirectional connections.

22. The method of claim 21, wherein the data file comprises a GERBER format.

23. The method of claim 21, further comprising integrating the circuit board into a device comprising one of a set top box, a music player, a video player, an entertainment unit, a navigation device, a communications device, a personal digital assistant (PDA), a fixed location data unit, or a computer.

24. A system comprising:
a first means for interconnecting; and
a second means for interconnecting coupled to the first means for interconnecting;
wherein the first means for interconnecting is coupled to a first master device via a single bidirectional connection and the first means for interconnecting is coupled to a second master device via at least two different bidirectional connections;
wherein the second means for interconnecting is coupled to the first master device and the second master device via the first means for interconnecting; and
wherein the second means for interconnecting is coupled to a memory via a memory controller.

25. The system of claim 24, wherein the second means for interconnecting is coupled to the first means for interconnecting via one fewer link than if the first means for interconnecting were coupled to the second master device via a single connection.

26. The system of claim 24, wherein the second means for interconnecting is coupled to the first means for interconnecting via a single bidirectional link.

27. The system of claim 24, wherein the second means for interconnecting is coupled to multiple memory devices.

28. A computer-readable storage device comprising processor-executable instructions that, when executed by a processor, cause the processor to:
couple a first interconnect to a first master device via a single bidirectional connection;
couple the first interconnect to a second master device via at least two different bidirectional connections;

couple a second interconnect to the first interconnect, wherein the second interconnect is coupled to the first master device and the second master device via the first interconnect; and couple the second interconnect to a memory via a memory controller.

29. The computer-readable storage device of claim 28, wherein the second interconnect is coupled to the first interconnect via at least one fewer link than if the first interconnect were coupled to the second master device via a single connection.

30. The computer-readable storage device of claim 28, wherein the second interconnect is coupled to the first interconnect via a single bidirectional link.

31. The computer-readable storage device of claim 28, wherein the second interconnect is coupled to multiple memory devices.

32. The computer-readable storage device of claim 28, wherein the second interconnect is directly coupled to a third master device via at least another bidirectional connection.

* * * * *